Oct. 30, 1951     I. R. BRENHOLDT     2,572,908
THICKNESS GAUGE FOR MAGNETIC MATERIAL
Filed Sept. 18, 1948     4 Sheets-Sheet 1

INVENTOR.
Irving R. Brenholdt
ATTORNEY

Oct. 30, 1951     I. R. BRENHOLDT     2,572,908
THICKNESS GAUGE FOR MAGNETIC MATERIAL

Filed Sept. 18, 1948     4 Sheets-Sheet 3

INVENTOR.
Irving R. Brenholdt
BY
ATTORNEY

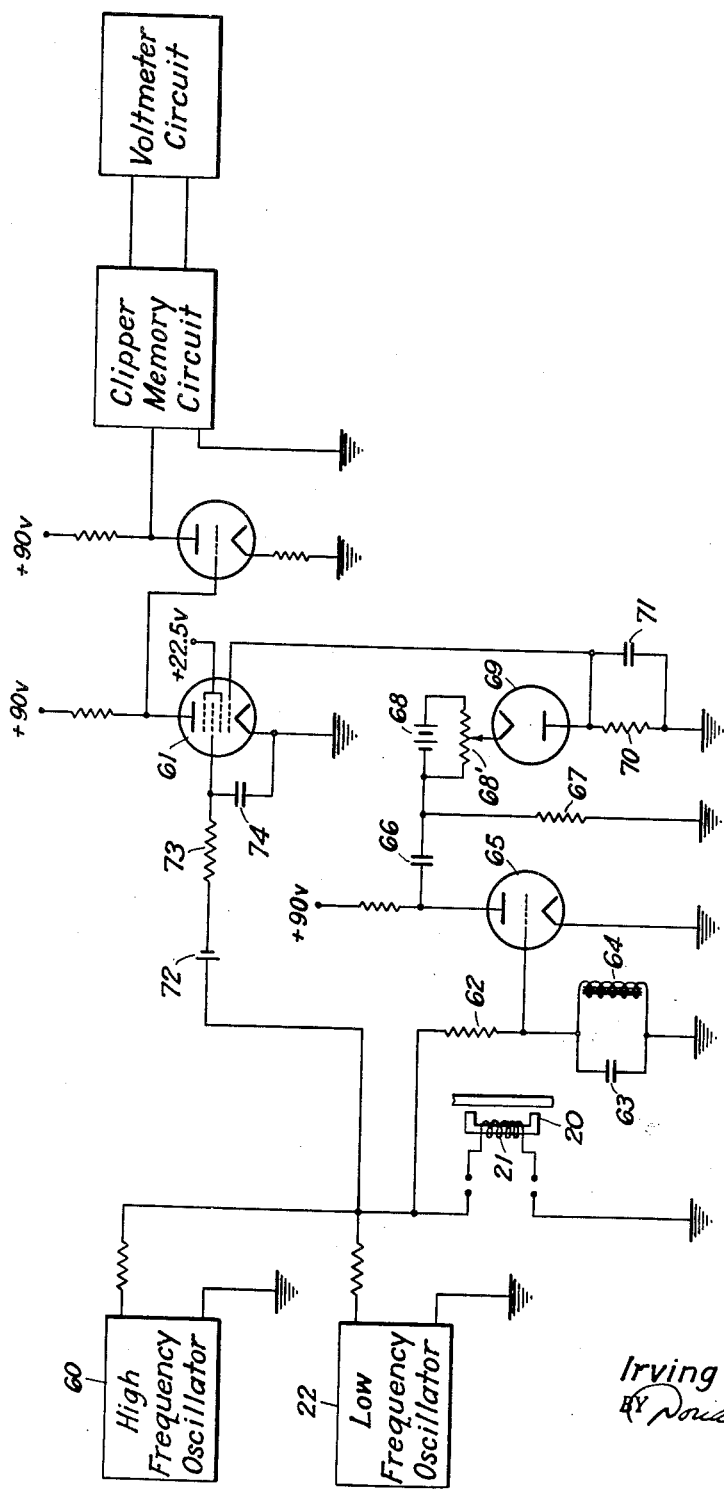

Patented Oct. 30, 1951

2,572,908

UNITED STATES PATENT OFFICE 2,572,908

THICKNESS GAUGE FOR MAGNETIC MATERIAL

Irving R. Brenholdt, Chicago, Ill., assignor to Standard Oil Company, Chicago, Ill., a corporation of Indiana Application September 18, 1948, Serial No. 49,976

8 Claims. (Cl. 175—183)

This invention relates to a thickness gauge for magnetic material such, for example, as iron and steel, and it pertains more particularly to an instrument for readily determining the thickness of a wall of said material where access can be had only to one side and where the wall is covered with dirt, scale, paint or other non-magnetic coating.

Instruments heretofore developed for measuring the thickness of a steel wall from one side are not only unduly expensive but have the inherent disadvantage that the surface of the material to be tested must be clean and smooth and it has been necessary that the probe for these devices be shaped to correspond to the contour of the material being tested. An object of this invention is to provide a low cost portable instrument which will accurately indicate the metal wall thickness of tanks, pressure vessels, pipes, etc. over a thickness range of at least 1/64 inch to an inch or more regardless of paint, dirt, rust, or other non-magnetic coating which may be present on the surface of the material being tested. A further object is to provide an instrument which may be used inside pipes, etc. at positions which have heretofore been considered inaccessible for thickness measuring instruments. Another object is to provide an instrument the use of which requires no technical or manipulative skill. Other objects will be apparent as the detailed description of the invention proceeds.

In my thickness gauge the basic principle of operation involves the measurement of core losses in a magnetic circuit but a unique feature of the system is the fact that these losses are measured without requiring physical or metallic contact between the measuring device and the material measured so that the measurement is unaffected by dirt, paint, scale, or other coating on the surface of the material. The gap involved in the magnetic circuit is automatically determined by the instrument itself when the measurement is made but the instrument gives a direct indication of the metal thickness rather than the thickness of the paint or of the space between the probe and the metal surface.

My thickness gauge comprises a stabilized low frequency oscillator connected to a sensory unit comprising a voltage-dividing impedance and an inductance winding on the core of a probe and constructed and arranged to cause a peak in the voltage across the coil as said probe reaches a predetermined distance which may be in the range of about .025 to .25, e. g. about .125 inch from the magnetic material being measured, a clipper-memory or capacitor circuit connected to the sensory unit for receiving and holding that portion of the peak voltage above a predetermined threshold level, and a high resistance vacuum tube volt meter circuit connected to the clipper-memory circuit for indicating the amplitude of said peak voltage above said threshold level.

In physical appearance the device may be enclosed in a case approximately the size of a portable radio provided with a thickness scale and movable indicator therefor, an off-on switch, a voltage regulating knob for controlling the threshold level in the clipper-memory circuit and a switch for discharging the capacitor in said circuit when the indicated reading has been noted and it is desired to make a further reading. The probe is a relatively small unit electrically connected to the sensory unit by a relatively long cable or cord. In operation the switch is turned on, the variable voltage knob is positioned in accordance with the general magnetic properties and thickness range of the test material, the probe is moved toward an area of the test material until it meets any dirt, paint, scale or other coating thereon, the metal thickness is indicated and the capacitor-discharge switch is then closed to prepare the instrument for making a further reading.

The operation of the device is based on the principle that there is a peak voltage across the inductance winding on the probe when the probe is at some predetermined distance, e. g. about 1/8 of an inch, from the surface of the material being measured. Such a peak voltage may be attained by providing for resonance of tuned circuits at the predetermined distance, by providing "in-phase" relationship between circuits at said predetermined distance, or by providing high frequency cut-off at said predetermined distance, etc. The relative amplitude of the peak voltage depends upon the thickness of the magnetic material being tested, the peak voltage being relatively high for thin test pieces and relatively low for thick test pieces. That portion of the peak voltage above a predetermined threshold level is built up across the capacitor in the clipper-memory circuit and its relative amplitude is indicated by the high resistance vacuum tube volt meter, the volt meter scale being preferably calibrated to indicate directly the metal thickness or percentage of variation from a standard steel sample of known thickness.

The invention will be more clearly understood from the following detailed description of illustrative examples read in conjunction with the accompanying drawings which form a part of this specification and in which Figure 1 is an isometric illustration of the external appearance of one particular thickness gauge;

Figure 6 is a circuit drawing of an instrument employing high frequency current for determining the air gap in conjunction with low frequency current for measuring metal thickness.

Figure 1:
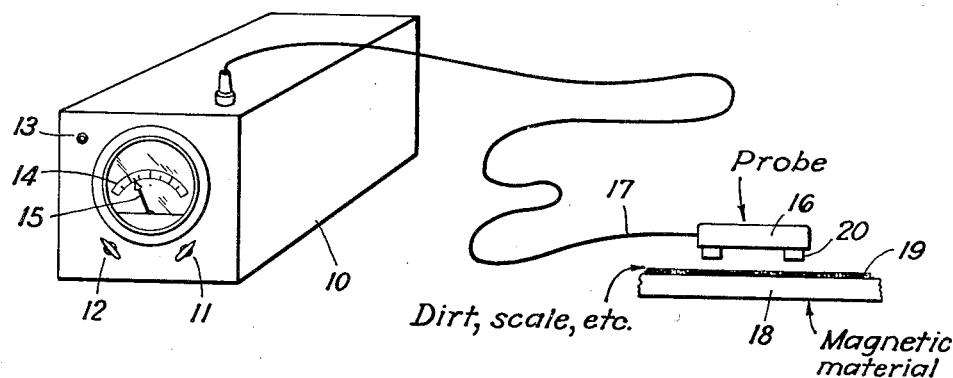

Referring first to the physical appearance of the instrument, the electrical circuits (and preferably also the batteries) are retained in a small carrying case 10 which is provided with an off-on switch 11, a voltage regulating switch 12, a capacitor-discharge switch 13, a thickness scale 14 and a movable indicator 15 cooperating with said scale. All but the protruding pole pieces of the probe are housed in a small receptacle 16. The probe windings are electrically connected to the sensory unit by flexible cord or cable 17. The probe is adapted to be moved in close proximity to an area of magnetic material 18 the surface of which may be coated with paint, dirt, scale, etc. 19.

The probe, which is electrically a part of the sensory unit, provides the magnetic flux which is applied to the material under test. The probe housing may fit into the palm of an operator's hand and the probe itself (see Figure 2) may consist of a U-shaped laminated yoke 20 fabricated, for example, of silicon steel or other material of the type conventionally employed in transformer coils. In this particular example the yoke or half core may be about ½ inch in thickness with the bar about 4 to 6 inches and the legs about 1 to 2 inches long. Inductance coil 21 is wound on the yoke and in order to obtain a high flux density without requiring a large supply of current it is desirable to employ a relatively large number of turns. On the other hand, it is desirable to use a relatively heavy wire to minimize losses due to direct current resistance. About 1500 turns, of No. 28 copper wire, have been found to be very satisfactory. The physical dimensions of the yoke depend upon the maximum thickness of the material to be measured and in general the greater the thickness to be measured the greater must be the length and cross-sectional area of the yoke.

The oscillator 22 may be of the vacuum tube type or of any other type known to those skilled in the art for delivering alternating voltage or current with a power of about 1 watt at a stable voltage amplitude. The frequency may be in the range of 5 to 200 or more cycles per second, preferably about 20 to 30, or approximately 50 cycles per second. The variation in frequency and voltage amplitude should not exceed 1% and should preferably be less than 0.1%.

Figure 2:
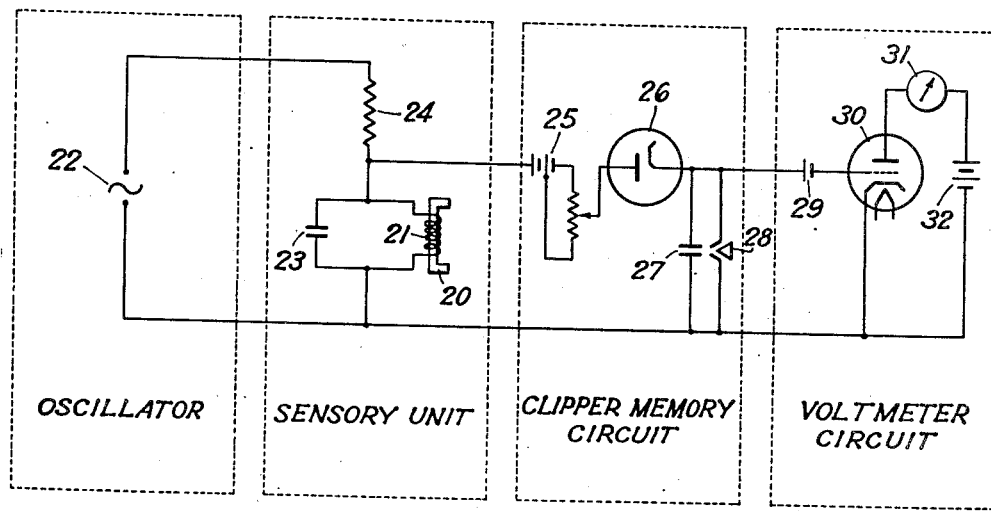
Figure 2 is a representation of the basic circuit when a tuned resonance circuit is employed in the sensory unit.

In the sensory unit of Figure 2 a capacitor 23 is connected in parallel with inductance coil 21 to tune the circuit so that resonance is attained when the probe is in the range of .025 to .25, e. g. about .125 inch from the material to be tested. When the two air gaps are not equal, then their sum should be in the range of .05 to 0.5 inch. An impedance 24 is connected in series with coil 21 to form a voltage divider across the terminals of the oscillator 22. Alternatively, capacitor 23 may be omitted and impedance 24 may be a capacitor instead of a resistance element. In the electrical circuit the probe forms a part of the sensory unit and the sensory unit is thus constructed and arranged so that a peak voltage is developed across coil 21 when the probe is at the stated distance from the material being measured.

A point between impedance 24 and one end of inductance coil 21 is connected through a variable voltage device 25 to the plate of clipper tube 26 the cathode of which is connected through capacitor 27 to the other end of inductance coil 21. This constitutes the main elements of a rectifier circuit, which will be referred to as the clipper-memory circuit. A switch 28 is connected in parallel with capacitor 27 so that in open position the capacitor may be charged and in closed position it may be discharged. Variable voltage device 25 may constitute a battery connected with a variable voltage divider resistance or potentiometer to vary the voltage applied to the plate of the clipper tube, in accordance with the nature of the material tested and the relative thickness of the test piece, this voltage being controlled on the instrument by knob 12 in Figure 1. As the probe approaches the test piece the voltage across inductance coil 21 above the level determined by the negative voltage on the plate of the clipper tube is built up across and retained by capacitor 27. As hereinafter described, I prefer to employ a transformer in the clipper-memory circuit (see Figure 4). But in any event the function of this circuit is to build up and hold a rectified or D. C. potential proportional to the alternating voltage above a given threshold level that is developed across the inductance coil of the probe as the position of peak voltage is passed.

The clipper-tube side of condenser 27 is connected through a bias battery 29 to the grid of tube 30 the plate of which is connected to one terminal of meter 31, the other terminal of which is connected to the battery 32. The meter 31 thus gives an indication of the amplitude of the voltage across condenser 27 without appreciably discharging said condenser. The meter is read by movable element 15 across scale 14 which may be calibrated in metal thickness.

While the fundamental relationship of the stabilized low-frequency oscillator, sensory unit, clipper-memory circuit, and high resistance vacuum tube voltmeter circuit is illustrated in Figure 2, it should be understood that each element thereof may be extensively modified and/or made more precise and accurate by use of alternative circuits some of which will be hereinafter described. However, before describing said circuits, reference will be made to Figure 3 which illustrates how variations in peak voltage amplitude give an indication of the thickness of magnetic material. Assuming that an alternating current voltmeter 33 were connected across inductance coil 25 of the probe and that the probe is moved toward or away from a relatively thin test piece 18A while being furnished with alternating current from oscillator 22 through resistor 24, maximum voltage indicated by point M is obtained when the probe reaches a certain distance from the test material which distance may be varied by changing the capacity of capacitor 22 and may for example be about ⅛ inch. The voltage rapidly drops as the probe moves in either direction from this position of resonance. If the probe is similarly moved toward and away from a thick test piece of magnetic material 18B, the point of maximum voltage will again occur at the same distance from the test piece (the point of resonance) but the voltage amplitude will be much less because eddy currents set up in the test piece create in effect a resistance element which is in parallel with the inductance coil so that in this case the peak voltage is at a lower level L. If a test piece were intermediate in thickness between that of 18A and 18B, then the maximum peak voltage at resonance would be at a point between M and L. In my instrument (referring to Figure 2) capacitor 27 retains the peak voltage amplitudes above the threshold level indicated by line 34 determined by the negative voltage applied by variable voltage device 25 to the plate of the clipper tube. This amplitude is indicated by the voltmeter 31 which is calibrated to read directly the thickness of the metal being tested.

In actual use the instrument is first calibrated by moving it toward and in close proximity to a plate which is of known thickness, e. g. ⅛ inch and of the same composition (i. e. same magnetic properties) as the materials to be tested. The manner of approaching the test piece should be the same as that of approaching the piece to be measured. The probe may be parallel in its approach, but I prefer to place one end of the half core on the material (i. e. on the paint, scale, or coating) and then slowly move the other end toward the test piece. This may be accomplished by the use of a spring or dash-pot (not shown) to limit the speed of movement of one end of the probe toward the test piece. Knob 12 is then adjusted to vary the voltage applied to the anode or plate of clipper tube 26 so that the indicator will be positioned at the mid-point of the scale. When the instrument is thus set it can be employed to determine thickness ranging from about $\frac{1}{64}$ inch up to about $\frac{1}{4}$ inch. Similarly when calibrated to have the indicator at mid-point with a $\frac{1}{4}$ inch plate, readings may be made from about $\frac{1}{8}$ inch to $\frac{1}{2}$ inch. The variation of the voltage applied to the clipper tube anode or plate controls the threshold of meter measurements or in other words, it controls the voltage amplitude throughout which the meter indicator remains on the scale.

Figure 4:
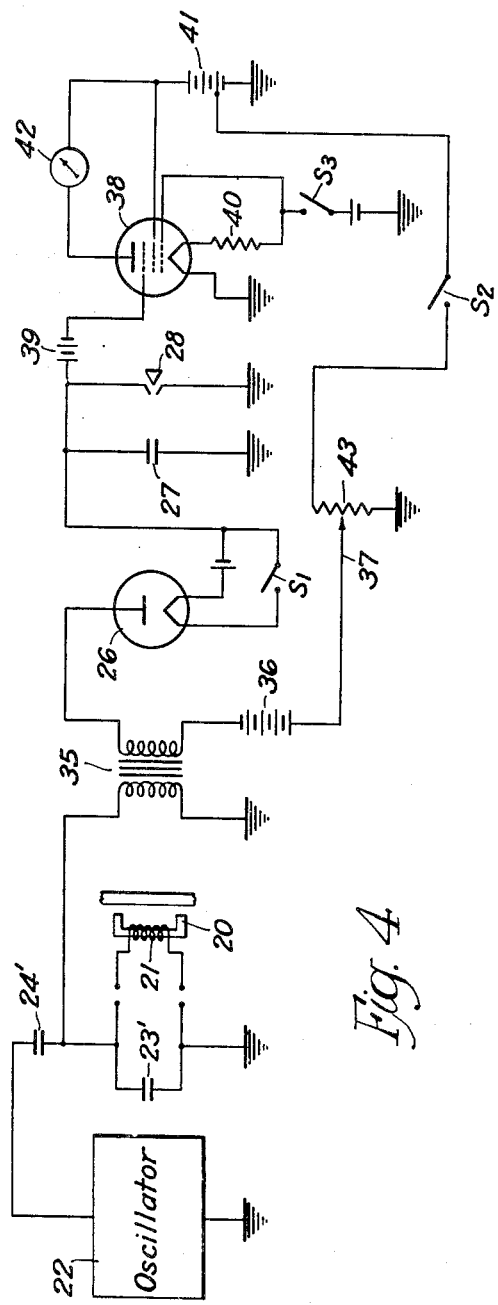
Figure 4 is a circuit drawing of an instrument employing resonance in the sensory unit.

Figure 4 is an illustrative circuit wherein the principle of resonance is employed to determine the air gap for peak voltage. In this case oscillator 22 is the same as described in Figure 2. Impedance 24' is a .5 mf. capacitor and impedance 23' is a 10 mf. capacitor. In this case the voltage across the inductance coil of the probe is stepped up by transformer 35 and the negative D. C. voltage on the anode or plate of clipper tube 26 is provided by a 22½ volt battery 36. A variable potential control 37 is operated by knob 12 (see Figure 1). The difference in peak amplitude voltage is built up across condenser 27. A pentode 38 is employed in the high resistance vacuum tube volt meter circuit which comprises 1½ volt battery 39 (which may be positioned between switch 28 and the ground connection instead of in the position shown), a 7.5 ohm, wire-wound resistance 40, a 7½ volt battery 41 and a 0–100 microampere meter 42 which functions as a volt meter. In this case a 5,000 ohm helical potentiometer resistance 43 is connected across one or more cells of battery 41 to form a part of the voltage control for the plate of the clipper tube 26. Battery 41 provides the anode voltage for tube 38. The filament power for the tubes is supplied by a 1½ volt battery which may be common to the oscillator circuit—switches S1, S2 and S3 as well as the switches controlling power to the oscillator are turned on and off by switch 11.

Figure 3:
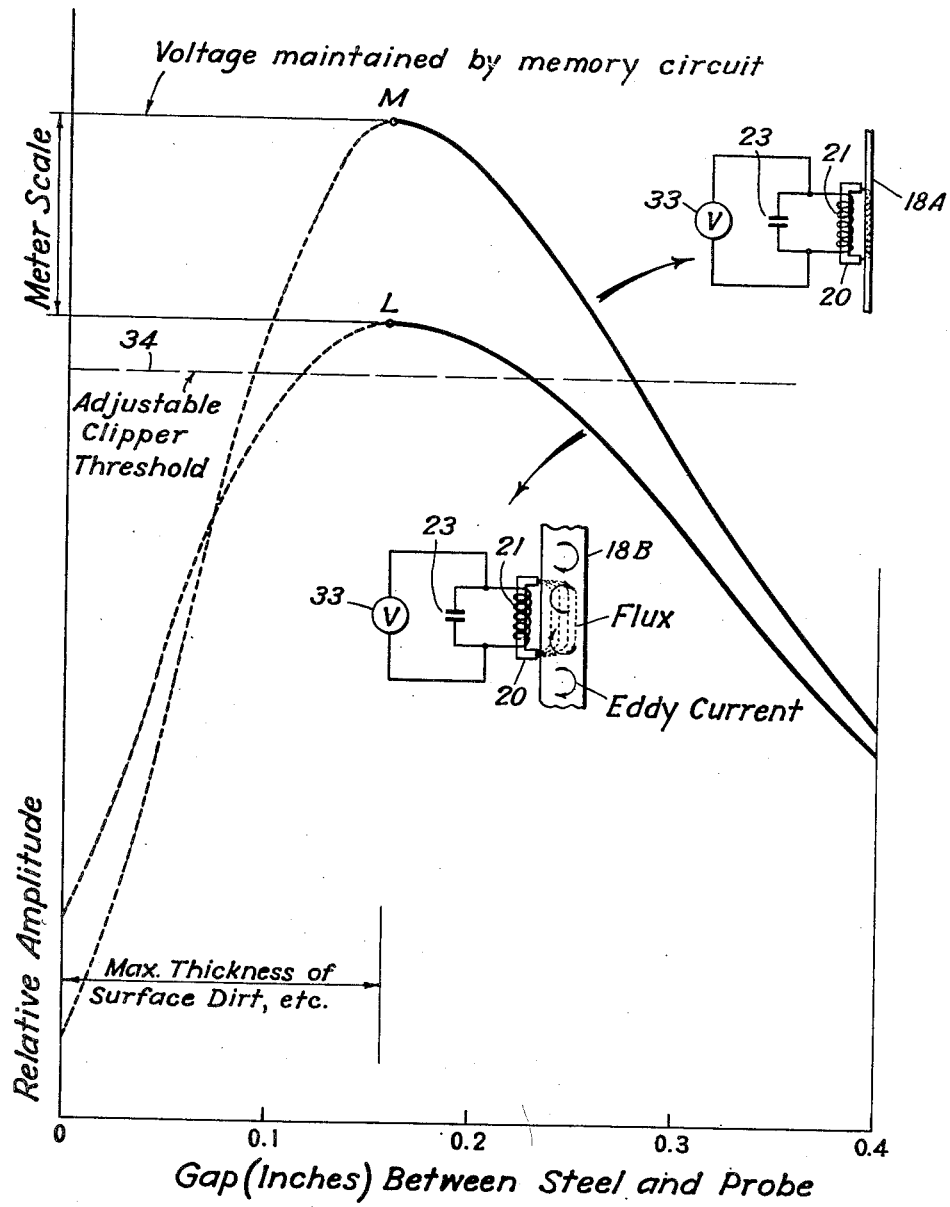
Figure 3 is a graph illustrating the effect on peak voltage amplitude of the relative thickness of magnetic materials being tested with an instrument employing resonance in the sensory unit.
Figure 5:
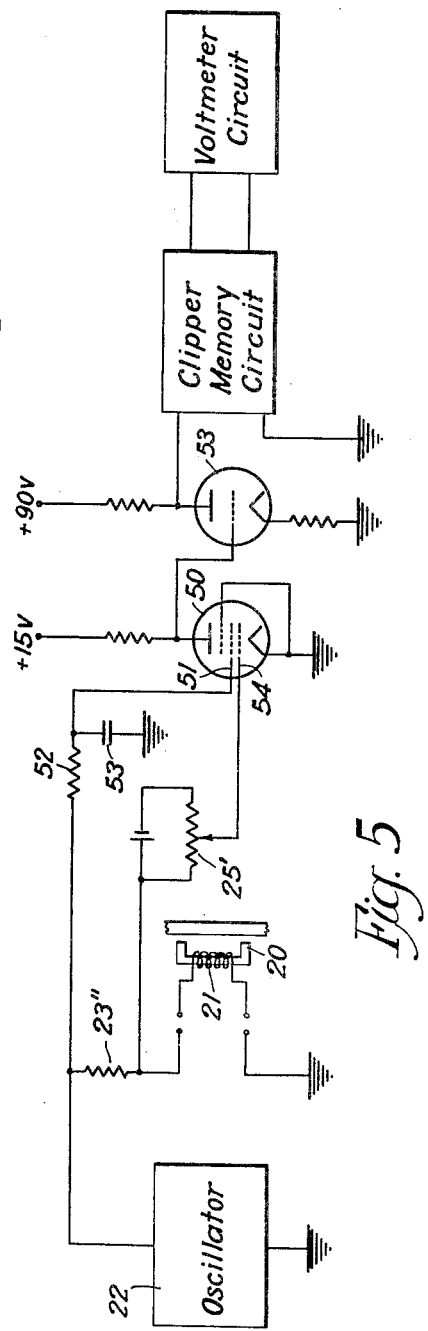
Figure 5 is a circuit drawing of an instrument employing phase shift in the sensory unit.

In Figure 5 I have illustrated a circuit employing phase-shift instead of resonance in the sensory unit. In this case a low frequency voltage of about 50 cycles per second from oscillator 22 is applied to the screen grid 51 of pentode tube 50 through a fixed phase-shifting network consisting of resistance 52 and a capacitor 53. Tube 50 can conduct current only on positive half cycles of this screen grid voltage. When the probe 16 is brought to a preselected distance from the test material the voltage across inductance coil 21 which is applied to the control grid 54 will be in phase with the voltage on the screen grid 51. Under these conditions maximum current flows in the amplifier tube 53. As the probe is brought still closer to the test material the voltage applied to the control grid 54 shifts out of phase with the voltage applied to the screen grid 51. The curve of air gap vs. current in tube 50 is similar to the curve obtained with a resonant circuit involving inductance and capacitance (Figure 3). Since the voltage which appeared on the anode of tube 50 is of the opposite polarity to that required to operate the capacitor circuit previously described, it is necessary to invert the polarity by means of the stage including amplifier 53. Functions of the remaining elements of this circuit correspond to those previously discussed and require no further description.

The circuit of Figure 6 illustrates the use in the sensory unit of a high frequency oscillator 60 (5000 cycles) and low frequency oscillator 22 (50 cycles). Since the high frequency flux tends to concentrate near the surface of the magnetic material under test (skin effect) it is therefore not appreciably affected by changes in thickness of the material. The high frequency component of the voltage across coil 21 varies primarily with the change in the air gap between the probe and the test material and may therefore be used to cause tube 61 to cut off when the air gap is a certain predetermined value. The high frequency component is separated from the low frequency component by means of the tuned, band-pass filter consisting of resistance 62, capacitor 63 and inductance 64. The resulting filtered high frequency voltage is fed to the amplifier tube 65. The amplified voltage is fed through capacitor 66 to resistance 67. Negative half-cycles having a peak voltage exceeding the voltage applied to the cathode of diode tube 69 by bias battery 68 and potentiometer 68' cause current to flow through diode tube 69 and resistance 70. This action produces a negative D. C. voltage across capacitor 71 which is applied to a control grid of the low frequency amplifier 61. The part of the low frequency voltage from oscillator 22 applied to the coil 21 is applied through the bias battery 72 to a low pass filter consisting of resistor 73 and condenser 74 to a grid of pentode 61. This voltage increases with decrease in the air gap but decreases at any one gap spacing with an increase in the thickness of the magnetic material. As the probe is brought near the test material the output of tube 61 will increase until the tube 69 begins to draw current at which time the output of tube 61 is caused to decrease due to the action of the negative voltage applied to the control grid by tube 69. The point at which this peak occurs may be selected by adjusting the voltage of the bias battery 68 or potentiometer 68'.

From the above description of various examples it will be seen that I have accomplished the objects of the invention. In each instance I employ combination of a stabilized low frequency generator, a sensory unit including a probe with inductance winding and designed to give a peak voltage as the probe comes within a predetermined distance from the test sample, a clipper-memory circuit for retaining peak voltage in a predetermined range and a high resistance vacuum tube volt meter for indicating the amplitude of the peak voltage in the predetermined range. While the clipper-memory circuit is advantageous, it could be eliminated and a high impedance volt meter connected directly across the probe coil. Also measurements may be made across impedance 24 or 24' instead of across the probe inductance coil. Each component of the entire instrument may be modified in various ways in addition to those illustrated in the cited examples and amplifiers may be employed in the various stages as is well known to those skilled in the art.

I claim:

1. An instrument for determining the thickness of magnetic material from one side thereof without requiring direct contact therewith, which instrument comprises a probe for producing flux in a test area, which probe consists essentially of a half-core with an inductive winding, a low-frequency alternating-current generator, a sensory unit comprising an impedance connected in series with said inductive winding across the output of said generator to form a voltage divider, a clipper-memory circuit including a capacitor for receiving and retaining peak voltages above a threshold level, the source of said peak voltages being one part of said voltage divider, a high-resistance voltmeter for indicating the voltage across said capacitor, and means connected in said sensory circuit for producing peak voltage in said clipper-memory circuit when the probe reaches a predetermined distance from the magnetic material being tested.

2. Apparatus according to claim 1 wherein said means comprises a capacitor forming with said coil a resonant circuit.

3. Apparatus according to claim 1 wherein said means comprises a circuit responsive to phase shift.

4. Apparatus according to claim 1 wherein said means comprises a second alternating generator of frequency considerably higher than that of said low-frequency alternating-current generator, an amplitude control circuit responsive only to low frequency voltage across said winding, and means responsive to the higher frequency voltage across said winding for controlling the response of said amplitude control circuit.

5. An instrument for determining the thickness of a ferromagnetic wall from one side of said wall without requiring direct contact therewith, which instrument comprises a probe consisting essentially of a U-shaped half-core, windings of wire on said core to form an induction coil, a stabilized low-frequency alternating-current generator, connected to said coil through an impedance, a tuning capacitor connected across said coil to resonate at the frequency of said generator when said half-core is a predetermined distance from said wall, a clipper-memory circuit including a capacitor, said circuit being connected across said coil, and a high-resistance vacuum-tube voltmeter connected across said capacitor, said voltmeter including an indicator responsive to said capacitor voltage, and a switch for discharging said capacitor.

6. An instrument for determining the thickness of a ferromagnetic wall from one side of said wall without requiring direct contact therewith which instrument comprises a probe for producing flux in a test area which probe consists essentially of a half-core wound with an induction coil comprising a large number of turns of heavy wire, a stabilized low-frequency alternating current generator, an impedance connected across said generator in series with the induction coil to form a voltage divider, a capacitor connected in parallel with said coil and of such capacity as to provide resonance when the probe comes within a predetermined distance from the magnetic material whereby peak voltage is developed across said coil at said predetermined distance, a clipper tube with its plate connected to one side of the coil and its cathode connected through a capacitor to the other side of the inductance coil, a voltage regulator for controlling the threshold operation of the clipper tube whereby voltage above a predetermined threshold level may be received and retained by said capacitor and a high-resistance vacuum tube voltmeter for indicating voltage across said capacitor.

7. The instrument of claim 6 which includes a transformer for increasing the voltage developed across said induction coil before said voltage is applied to said clipper tube.

8. An instrument for determining the thickness of magnetic material from one side thereof without requiring direct contact therewith which instrument comprises a probe for producing flux in a test area which probe consists essentially of a half-core with an inductive winding, a stabilized low-frequency alternating current generator, a sensory unit comprising an impedance connected in series with said inductive winding across the output of said generator to form a voltage divider, said sensory circuit including impedances of such size and arrangement to provide a peak effective voltage across said coil when the probe reaches a predetermined distance from the magnetic material being tested, a clipper-memory circuit including a capacitor for receiving and retaining effective peak voltages above a threshold level, and a high resistance vacuum tube voltmeter for indicating the amplitude of said effective peak voltage above the threshold level.

IRVING R. BRENHOLDT.

REFERENCES CITED

The following references are of record in the file of this patent:

UNITED STATES PATENTS

| Number | Name | Date |
|---|---|---|
| 2,033,654 | Selquist et al. | Mar. 10, 1936 |
| 2,057,835 | Karajan et al. | Oct. 20, 1936 |
| 2,078,796 | Greentree et al. | Apr. 27, 1937 |
| 2,146,857 | Scott | Feb. 14, 1939 |
| 2,154,156 | Turner et al. | Apr. 11, 1939 |
| 2,189,092 | Urmenyi | Feb. 6, 1940 |
| 2,228,294 | Wurzbach | Jan. 14, 1941 |
| 2,349,992 | Schrader | May 30, 1944 |
| 2,353,211 | Zuschlag | July 11, 1944 |

FOREIGN PATENTS

| Number | Country | Date |
|---|---|---|
| 299,388 | Great Britain | Aug. 8, 1929 |